2,713,021
Patented July 12, 1955

2,713,021

COUNTER-CURRENT FRACTIONATION OF ADRENOCORTICOTROPHIC HORMONE SUBSTANCES

Wilfrid F. White and Joseph W. Giffee, Chicago, Ill., assignors to Armour and Company, Chicago, Ill., a corporation of Illinois No Drawing. Application July 1, 1950,
Serial No. 171,758

3 Claims. (Cl. 167—74)

This invention relates to the fractionation of adrenocorticotrophic hormone substances. The invention is particularly useful in the treatment of a mixture containing the adrenocorticotrophic hormone substance for the elimination of contaminants and for producing a product of exceedingly high potency.

An object of the invention is to provide a process for the fractionation of a crude form of adrenocorticotrophic hormone substances to produce a product of extremely high potency. Another object is to provide a process for the adrenocorticotrophic hormone by treatment of the hormone substance with two or more immiscible liquid phases to effect a counter-current distribution. Yet another object is to provide a process involving a counter-current distribution of the hormone substance and contaminants thereof employing immiscible liquids having known solvent properties for the hormone substance to concentrate the activity for ready recovery. Other specific objects and advantages will appear as the specification proceeds.

In one embodiment of the invention, we treat a preparation containing contaminants and adrencorticotrophic hormone substance with two or more immiscible liquid phases to effect a counter-current distribution and by which a product of unusually high activity is obtained. In the counter-current distribution system, we add the mixture containing the hormone and contaminants, preferably in a dry state, to a mixture of two immiscible liquid phases in the first of a series of mixing chambers. The mixture is then equilibrated, preferably by shaking or agitation, and then when the phases have separated, either by gravity or centrifugation, the lower layer is withdrawn and transferred to a second mixing chamber where it is equilibrated with a new upper layer. At the same time, the original upper layer is equilibrated with a new lower layer in the first mixing chamber. The process is continued until all of the chambers are filled. The dissolved material in each chamber is then recovered by renewing the solvents in any suitable manner. By selecting the proper solvent system, the potency of one or more of the fractions will be considerably increased.

Depending upon what solvents are employed, the adrenocorticotrophic hormone activity partitions between the phases in accordance with its distribution coefficient. At the same time, the impurities partition according to their distribution coefficients. By taking advantage of differences in the distribution coefficients, an effective separation is brought about.

Any adrenocorticotrophic hormone-containing substance may be employed as the starting material. We prefer to employ a fairly well purified substance, such as the product obtained by Joseph D. Fisher in his copending application Serial No. 122,588, now abandoned, for Adrenal Gland Stimulating Concentrate and Method for the Preparation Thereof, or the product obtained by the process described in the application of Lottie J. Walaszek, Serial No. 172,011, for Adrenal Gland Stimulating Substance and Method of Preparing, said Fisher and Walaszek applications being assigned to Armour and Company, as is the present application. In the latter process there is obtained a partially purified adrencorticotrophic hormone preparation which has been subjected to a partial proteolytic enzyme hydrolysis, isolated from contaminating protein or protein degradation products by treatment with trichloroacetic acid, and freed of salts by dialysis.

The solvent system which we have found to be particularly well adapted to the above-described counter-current distribution system comprises the use of phenol and water. When these solvents are used, the hormone substance tends to concentrate in the lower or phenol layer. We find, however, that the adrenocorticotrophic hormone substance can be caused to concentrate in the upper or water layer by adding ether to the mixture. By the adding of ether to the water-phenol system, there is a modification of the position of the peak hormone substance activity. For example, when 15% ether is added to the system, the hormone substance tends to concentrate in the upper or water-rich layer. By varying the amount of phenol and ether, it is possible to remove as much as 80% of the impurities from the adrenocorticotrophic hormone substance, as determined by animal assay technique.

The ether may be added in the proportions of 2.5–15% of ether based upon the phenol used. By selecting a desired amount of ether (usually about 7.5%), the two liquid solvents (phenol and water) can be caused to have just about equal solvent properties for the hormone substance. Thus, when the mixture is added to such liquids, it is found that the hormone substance or activity becomes equally divided by the two liquids. At the same time, the distribution coefficients of the impurities in these liquids are different and by the counter-current distribution there is obtained a concentration of the activity in selected chambers or plates.

In one example of the process, the starting material containing the hormone substance is added in a dry state to the phenol and water layers in the first of a series of chambers. Preferably the solvent properties of the phenol and water for the hormone substance have been equalized by the addition of ether thereto. After the mixture of the hormone material with the phenol and water in the first of the chambers, the two liquid phases are allowed to separate and the lower layer is removed and transferred to a second mixing chamber where it is equilibrated with a new upper layer. The original upper layer is equilibrated with a new lower layer in the first mixing chamber. In continuing this operation in a counter-current distribution system, it is found that the greater concentration of the hormone substance is obtained in the central portion of the chambers or plates and may be recovered in a highly concentrated form in such selected chamber or plate. The concentrated product may be lyophilized or otherwise recovered in a dry state.

The process is effectively operated at temperatures ranging from 0° to 40° C. We prefer, however, to use room temperature.

By employing the above method, it was possible, using the phenol-ether-water system, to increase the potency of an enzyme-digested adrenocorticotrophic hormone material from five times greater than Standard to one-hundred twenty times greater than Standard. In another experiment, there was an increase in the potency from twenty-nine to two-hundred-thirty times greater than Standard, these results being based on animal assay. Other solvents may be used to accomplish a counter-current distribution purification of the adrenocorticotrophic hormone substance, as for example, butanol-methanol-water mixtures. In this system, methanol, like the ether in the former system, modifies the relative solvent properties of the immiscible liquids butanol and water.

With respect to potencies, the generally-accepted standard is that which has been adopted by The Technical Advisory Committee to the Study Section for Metabolism and Endocrinology of the National Institutes of Health. This Standard is approximately that of a physically-chemically pure hormone extracted from the pituitary glands and described by Sayers, Sayers and Woodbury in Endocrinology, volume 42, No. 5, May, 1948, page 385. A second Standard, known in the literature as the Armour Standard (LA1A), is 1.2 times the above-mentioned Standard.

Specific examples of the process may be set out as follows:

Example 1

A crude product containing adrenocorticotrophic hormone substance obtained by the extraction of animal pituitary glands was subjected to a 12 plate (or chamber) distribution using the following system:

200 ml. water
90 ml. 90% phenol
5 ml. anhydrous ether
100 mg. potassium chloride The procedure was carried out as follows: The ingredients listed above were placed in a separatory funnel and the mixture was shaken for 5 minutes. The layers were allowed to separate, about 15 minutes being required. The lower layer was drawn off and transferred to a dispensing burette. The upper layer was also transferred to a dispensing burette.

A rack was set up containing 13 glass stoppered tubes of about 20 ml. capacity and arranged so that the entire system could be inverted by turning a crank. The tubes were numbered serially from 0 to 12. Eight ml. of the upper layer was added to each tube from the dispensing burette. The sample, weighing 125 mg., was dissolved in 8 ml. of the lower layer, and this solution was transferred to tube 0. All stoppers were tightened and the entire rack was inverted thirty times. After separating the phases in tube 0 by centrifuging, the lower layer was transferred to tube 1, which already contained an upper layer. At the same time a new lower layer was added to tube 0. The rack was again inverted thirty times and the phases of tubes 0 and 1 were allowed to separate. The lower layers in tubes 0 and 1 were then transferred to tubes 1 and 2, respectively, and a new lower layer was added to tube 0. The system was then again ready for mixing. This process was continued until all tubes were filled. In recovering the dissolved material, each tube was handled separately. The contents were poured into a separatory funnel and 60 ml. ether was added. After shaking thoroughly, the aqueous (lower) layer, which contains the hormone substance, was drawn off. This layer was washed twice with 10 ml. ether and lyophilized to recover the solids. In this way, 13 fractions were obtained. The potassium chloride ingredient has no effect on the distribution of the adrenocorticotrophic hormone substance, and its only functions are to minimize foaming and promote ease of settling, as is well-known in the art.

In the above process, after the contents are poured into a separatory funnel and 60 ml. ether added, the ether causes the phenol to lose its property of solubility for the hormone substance and the hormone substance is collected entirely in the lower or aqueous layer, thus permitting ready recovery of the substance from this layer. In the following examples, the final separation in a separatory funnel is carried through in the same manner.

In the intermediate tube 5, it was found that the solid material, which represented about 10% of the weight of the original sample, had a potency equal to twenty times the Standard.

Example 2

An adrenocorticotrophic hormone product having a potency of eighteen times Standard and prepared by the peptic hydrolysis-trichloroacetic acid precipitation and short dialysis method of the Walaszek application identified above, was submitted to a 12 tube counter-current distribution as in Example 1. The material recovered from tubes 5 and 6 was then submitted to a second counter-current distribution of 24 tubes, again using the same system. The material recovered from tube 12 showed a potency of one hundred and twenty times Standard.

Example 3

An adrenocorticotrophic product of high potency obtained from the extraction of animal pituitary glands, the potency being fifteen times Standard, was submitted to a 12 tube counter-current distribution using the following system:

100 ml. water
100 ml. n-butanol
28.2 ml. methanol

The material recovered from tubes 11 and 12 represented 36% by weight of the starting material and had a potency of twenty-five times Standard.

Example 4

An adrenocorticotrophic hormone product (obtained by the extraction of animal pituitary glands and purified) having a potency of about forty times Standard and prepared by the peptic hydrolysis-trichloroacetic acid precipitation and short dialysis method of the Waleszek application (above) was subjected to a 24 tube counter-current distribution using the same system as in Example 2. The material recovered from tube 17 had a potency of about two hundred times Standard.

While in the foregoing specification we have set forth specific steps of the process in considerable detail for the purpose of illustrating specific embodiments of the invention, it will be understood that such details may be varied widely by those skilled in the art without departing from the spirit of our invention.

We claim:

1. The method of increasing the potency of an adrenocorticotrophic hormone preparation, comprising subjecting an adrenocorticotrophic hormone preparation containing ACTH-active and ACTH-inactive components to counter-current distribution in a 2-phase solvent system formed essentially of phenol, water, and ether, one of said phases containing a greater proportion of water than of phenol and the other of said phases containing a greater proportion of phenol than of water, said ether being present in the proportion of from 2.5 to 15% based on the phenol, whereby the ACTH-active components of said preparation tend to concentrate in said phase containing the greater proportion of water while said ACTH-inactive components tend to concentrate in said phase containing the greater proportion of phenol, and recovering an adrenocorticotrophic hormone preparation of enhanced potency from said phase containing the greater proportion of water.

2. The method of claim 1 in which said ether is present in the proportion of about 7.5% based on the phenol.

3. The method of claim 1 in which said process is operated at a temperature between 0° C. and 40° C. during said countercurrent distribution step.

References Cited in the file of this patent

UNITED STATES PATENTS

| | | |
|---|---|---|
| 2,074,492 | Swingle | Mar. 23, 1937 |
| 2,134,256 | Laland | Oct. 25, 1938 |
| 2,358,869 | Maurer | Sept. 26, 1944 |

OTHER REFERENCES

Craig in J. Biol. Chem. 155, pp. 519–534 (1944).
Craig in J. Biol. Chem. 161, pp. 321–332 (1945).
Craig in Anal. Chemistry 21, pg. 500, April 1949.
Raymond in Anal. Chem. 21, pp. 1292–1293 (1949).
Swart in J. Am. Chem. Soc., August 1949, pp. 2942–2945.
Smith in Proc. of the Biochemical Soc., October 1948, pp. VIII, IX.